United States Patent
Ribas et al.

(10) Patent No.: US 7,693,521 B1
(45) Date of Patent: Apr. 6, 2010

(54) METHOD AND SYSTEM FOR MOBILE STATION HANDOFF

(75) Inventors: Hector M. Ribas, Overland Park, KS (US); Abhijit V. Apte, Overland Park, KS (US); Ryan S. Talley, Olathe, KS (US); Meng Y. Yew, Lenexa, KS (US)

(73) Assignee: Sprint Spectrum L.P., Overland Park, KS (US)

(*) Notice: Subject to any disclaimer, the term of this patent is extended or adjusted under 35 U.S.C. 154(b) by 238 days.

(21) Appl. No.: 10/910,854

(22) Filed: Aug. 4, 2004

(51) Int. Cl.
*H04W 36/00* (2009.01)

(52) U.S. Cl. ........................ 455/437; 370/331; 370/332; 370/333; 455/436; 455/438; 455/440

(58) Field of Classification Search ......... 455/436–438, 455/440, 442–444, 453; 370/331, 332
See application file for complete search history.

(56) References Cited

U.S. PATENT DOCUMENTS

| | | | |
|---|---|---|---|
| 5,267,261 A | | 11/1993 | Blakeney et al. |
| 5,640,414 A | | 6/1997 | Blakeney et al. |
| 5,649,000 A | | 7/1997 | Lee et al. |
| 5,848,063 A | | 12/1998 | Weaver et al. |
| 5,883,899 A | * | 3/1999 | Dahlman et al. ............ 370/468 |
| 5,889,768 A | * | 3/1999 | Storm et al. ................ 370/320 |
| 5,940,761 A | | 8/1999 | Tiedemann et al. |
| 5,999,816 A | | 12/1999 | Tiedemann et al. |
| 6,021,122 A | | 2/2000 | Tiedemann et al. |
| 6,038,448 A | | 3/2000 | Chheda et al. |
| 6,069,880 A | * | 5/2000 | Owen et al. ................. 370/311 |
| 6,073,021 A | * | 6/2000 | Kumar et al. ............... 455/442 |
| 6,075,990 A | * | 6/2000 | Shin .......................... 455/440 |
| 6,078,570 A | * | 6/2000 | Czaja et al. ................. 370/331 |
| 6,097,954 A | * | 8/2000 | Kumar et al. ............... 455/442 |
| 6,178,164 B1 | | 1/2001 | Wang et al. |
| 6,181,943 B1 | | 1/2001 | Kuo et al. |
| 6,195,551 B1 | | 2/2001 | Kim et al. |
| 6,216,004 B1 | * | 4/2001 | Tiedemann et al. ......... 455/442 |
| 6,304,755 B1 | | 10/2001 | Tiedemann et al. |

(Continued)

FOREIGN PATENT DOCUMENTS

WO  WO 2004/112269 A1  12/2004

OTHER PUBLICATIONS

Wikipedia (online dictionary), Oct. 18, 2006, http://en.wikipedia.org/wiki/Pilot_signal.*

(Continued)

*Primary Examiner*—Lester Kincaid
*Assistant Examiner*—Charles Shedrick (57) ABSTRACT

A mobile station is associated with a first wireless coverage area that has a first pilot signal. A second wireless coverage area that has a second pilot signal is in the mobile station's neighbor list. The mobile station measures $E_1$, the energy per chip of the first pilot signal, and $I_1$, the total received power at the first pilot's frequency. The mobile station also measures $E_2$, the energy per chip of the second pilot signal, and $I_2$, the total received power at the second pilot's frequency. If $E_2$ exceeds $E_1$ by at least a first predetermined amount and $E_2/I_2$ exceeds $E_1/I_1$ by at least a second predetermined amount, then a handoff of the mobile station from the first wireless coverage area to the second wireless coverage area is effected.

27 Claims, 3 Drawing Sheets

U.S. PATENT DOCUMENTS

| | | | |
|---|---|---|---|
| 6,327,471 B1* | 12/2001 | Song | 455/440 |
| 6,337,984 B1 | 1/2002 | Hong et al. | |
| 6,400,952 B2 | 6/2002 | Kim et al. | |
| 6,430,414 B1 | 8/2002 | Sorokine et al. | |
| 6,434,387 B1 | 8/2002 | Lee | |
| 6,567,646 B1* | 5/2003 | Eklof et al. | 455/63.1 |
| 6,574,203 B2 | 6/2003 | Bernstein et al. | |
| 6,603,971 B1 | 8/2003 | Mohebbi | |
| 6,606,497 B2 | 8/2003 | Mohebbi | |
| 6,625,132 B1 | 9/2003 | Boettger et al. | |
| 6,636,735 B2 | 10/2003 | Mohebbi | |
| 6,658,252 B2 | 12/2003 | Mohebbi | |
| 6,662,019 B2* | 12/2003 | Kamel et al. | 455/522 |
| 6,721,564 B1 | 4/2004 | Kobayashi | |
| 6,771,963 B1* | 8/2004 | Cheng et al. | 455/437 |
| 6,873,826 B2* | 3/2005 | Becker | 455/67.11 |
| 6,954,643 B2* | 10/2005 | Petrus | 455/437 |
| 7,050,802 B2* | 5/2006 | Dent | 455/434 |
| 7,116,979 B2* | 10/2006 | Backes et al. | 455/434 |
| 7,171,211 B2* | 1/2007 | Muller | 455/448 |
| 2001/0006514 A1* | 7/2001 | Park | 370/331 |
| 2002/0039901 A1* | 4/2002 | Sugimoto | 455/436 |
| 2002/0071403 A1* | 6/2002 | Crowe et al. | 370/331 |
| 2004/0038682 A1* | 2/2004 | Persson et al. | 455/436 |
| 2004/0185851 A1* | 9/2004 | Nagai | 455/436 |
| 2004/0229616 A1* | 11/2004 | Dutta et al. | 455/436 |
| 2004/0267928 A1* | 12/2004 | Petrus | 709/225 |
| 2005/0096053 A1* | 5/2005 | Liu et al. | 455/439 |
| 2005/0124345 A1* | 6/2005 | Laroia et al. | 455/437 |
| 2005/0153736 A1* | 7/2005 | Ganton | 455/553.1 |

OTHER PUBLICATIONS

IEEE 55$^{th}$ Vehicular Technology Conference, VTC, Spring 2002.

* cited by examiner

METHOD AND SYSTEM FOR MOBILE STATION HANDOFF

BACKGROUND

1. Field of the Invention

The present invention relates to wireless telecommunications and, more particularly, to methods and systems for mobile station handoff.

2. Description of Related Art

Wireless telecommunications networks typically include a plurality of distinct wireless coverage areas, e.g., "cells" or "sectors," within which mobile stations can wirelessly communicate with the network. A base transceiver station (BTS) may provide a single wireless coverage area, e.g., a cell. Alternatively, a BTS may provide multiple wireless coverage areas, e.g., by using directional antennas to provide multiple sectors within the cell and/or by using frequencies. Each wireless coverage area may have allocated to it a distinct set of downlink channels that the BTS uses for transmitting signals to mobile stations and a distinct set of uplink channels that mobile stations may use for transmitting signals to the BTS. The downlink channels may include, for example, a pilot channel, paging channels, and traffic channels. The uplink channels may include, for example, access channels and traffic channels. A mobile station may be associated with a particular wireless coverage area by using or monitoring one or more of the wireless coverage area's channels. For example, a mobile station that is engaged in a call may be associated with a particular wireless coverage area by using uplink and downlink traffic channels allocated to that particular wireless coverage area. Even if not engaged in a call, a mobile station may be associated with a particular wireless coverage area, for example, by monitoring a paging channel allocated to that particular wireless coverage area.

A mobile station's associated wireless coverage area may change, for example, when the mobile station changes its location. Thus, when a mobile station is associated with a first or "source" wireless coverage area, a "handoff" process may be used so that the mobile station becomes associated with a second or "target" wireless coverage area. A handoff may occur when the mobile station is in an active state, e.g., when the mobile station is engaged in a call. For example, before the handoff, the mobile station may use traffic channels allocated to a first wireless coverage area, and, after the handoff, the mobile station may use traffic channels allocated to a second wireless coverage area. A handoff may also occur when the mobile station is an idle state. For example, before the handoff, the mobile station may monitor a paging channel allocated to a first wireless coverage area, and, after the handoff, the mobile station may monitor a paging channel allocated to a second wireless coverage area.

The decision whether to effect a handoff of a mobile station may be based, at least in part, on signal strength measurements taken by the mobile station. For example, the mobile station may measure the signal strength of the pilot channel of the wireless coverage area with which the mobile station is currently associated and the signal strengths of the pilot channels of one or more "neighboring" wireless coverage areas. A handoff controller may send the mobile station a list, e.g., a "neighbor list" or "extended neighbor list," of which pilot channels to monitor. If the pilot channel of a neighboring wireless coverage area is sufficiently stronger than the pilot channel of the current wireless coverage area, as measured by the mobile station, then a handoff of the mobile station from the current wireless coverage area to the neighboring wireless coverage area may be effected. In some cases, the handoff controller may be involved in effecting the handoff, e.g., if the mobile station is engaged in the call. When the handoff controller is involved in the process, the mobile station may report the measured signal strengths to the handoff controller, and the handoff controller may send a "handoff direction message" to the mobile station. In other cases, e.g., if the mobile station is an idle state, the mobile station may effect the handoff autonomously.

In a conventional approach, the mobile station measures the signal strengths of the pilot channels as relative signal levels, i.e., the ratio of the absolute signal level of the pilot channel to the total received power. Thus, in the example of a Code Division Multiple Access (CDMA) air interface, the relative signal level may be $E_c/I_0$, where $E_c$ is the energy per chip of the pilot channel and $I_0$ is the total received power at that frequency.

However, it has been found that this conventional approach can cause difficulties. Problems can arise because noise and interference contribute to $I_0$, such that $I_0$ can be different in different types of locations. For example, in urban areas $I_0$ can be anomalously high, due to many sources of noise and interference, thereby making $E_c/I_0$ anomalously low. In rural areas, however, $I_0$ can be anomalously low, due to few sources of noise and interference, thereby making $E_c/I_0$ anomalously high. As a result of these differences, handoffs to wireless coverage areas in urban areas may occur less readily than may be desirable, and handoffs to wireless coverage areas in rural areas may occur more readily than may be desirable.

SUMMARY

In a first principal aspect, the present invention provides a method for determining whether to effect a handoff of a mobile station from a first wireless coverage area to a second wireless coverage area. The first wireless coverage area has a first pilot signal and the second wireless coverage area has a second pilot signal. In accordance with the method, the mobile station measures a first absolute signal level ($E_1$) of the first pilot signal and a second absolute signal level ($E_2$) of the second pilot signal. A first relative signal level ($R_1$) of the first pilot signal and a second relative signal level ($R_2$) of the second pilot signal are determined. If $E_2$ exceeds $E_1$ by at least a first predetermined amount and $R_2$ exceeds $R_1$ by at least a second predetermined amount, the handoff of the mobile station from said first wireless coverage area to said second wireless coverage area is effected.

In a second principal aspect, the present invention provides a method of determining whether to effect an idle-state handoff of a mobile station. The mobile station monitors an active set that includes a primary pilot and a neighbor set that includes a plurality of neighbor pilots. In accordance with the method, the mobile station measures an absolute signal level ($E_P$) of the primary pilot and a relative signal level ($R_P$) of the primary pilot. The mobile station also measures absolute signal levels and relative signal levels of the neighbor pilots. If one or more of the neighbor pilots has an absolute signal level ($E_C$) that exceeds $E_P$ by at least a first predetermined amount and a relative signal level ($R_C$) that exceeds $R_P$ by at least a second predetermined amount, then a candidate pilot is designated from among these one or more neighbor pilots. An idle-state handoff to a wireless coverage area associated with the candidate pilot is effected.

In a third principal aspect, the present invention provides a method for determining whether to effect an active-state handoff of a mobile station from a source wireless coverage area to a target wireless coverage area. In accordance with the method, the mobile station measures an absolute signal level ($E_S$) of the source pilot signal, a relative signal level ($R_S$) of the source pilot signal, an absolute signal level ($E_T$) of the target pilot signal, and a relative signal level ($R_T$) of the target pilot signal. The mobile station transmits a measurement message to a handoff controller. The measurement message includes $E_S$, $R_S$, $E_T$, and $R_T$. The handoff controller compares $E_T$ to $E_S$ and compares $R_T$ to $R_S$. If $E_T$ exceeds $E_S$ by at least a first predetermined amount and $R_T$ exceeds $R_S$ by at least a second predetermined amount, the active-state handoff of the mobile station from the source wireless coverage area to the target wireless coverage area is effected.

DETAILED DESCRIPTION OF EXEMPLARY EMBODIMENTS

1. Overview

In exemplary embodiments of the present invention, the determination of whether to effect a handoff of a mobile station from a source wireless coverage area to a target wireless coverage area is made based on a comparison of both the relative signal levels and the absolute signal levels of the pilot channels of the source and target wireless coverage areas. Thus, if the pilot channel of the source wireless coverage area has an absolute signal level, $E_1$, and a relative signal level, $R_1$, and the pilot channel of the target wireless coverage area has an absolute signal level, $E_2$, and a relative signal level, $R_2$, then $E_2$ is compared to $E_1$ and $R_2$ is compared to $R_1$. If $E_2$ exceeds $E_1$ by at least a first predetermined amount and $R_2$ exceeds $R_1$ by at least a second predetermined amount, then a handoff may be effected. These comparisons could be made in various ways. For example, if the mobile station is an idle state, then the mobile station may make the comparisons and, if appropriate, may effect an idle-state handoff autonomously. However, if the mobile station is in an active state, e.g., involved in a call, then a handoff controller may make the comparisons, based on measurements reported by the mobile station, and, if appropriate, may effect an active-state handoff.

In an exemplary embodiment, the relative signal level of a pilot channel may be calculated as the ratio of the absolute signal level of the pilot channel to the total received power at that frequency. Thus, for the source wireless coverage area, the mobile station may measure, $E_1$, the absolute signal level of the source pilot channel, and $I_1$, the total received power at the source pilot's frequency, and, for the target wireless coverage area, the mobile station may measure $E_2$, the absolute signal level of the target pilot channel, and $I_2$, the total received power at the target pilot's frequency. The frequencies of the source and target pilot channels could be the same, or they could be different. $R_1$ could then be calculated as $E_1/I_1$ and $R_2$ could be calculated as $E_2/I_2$. In some cases, the mobile station may calculate $R_1$ and $R_2$. In other cases, a handoff controller may calculate $R_1$ and $R_2$, e.g., based on measurements of $E_1$, $E_2$, $I_1$, and $I_2$ reported by the mobile station.

2. Exemplary Architecture

Figure 1:
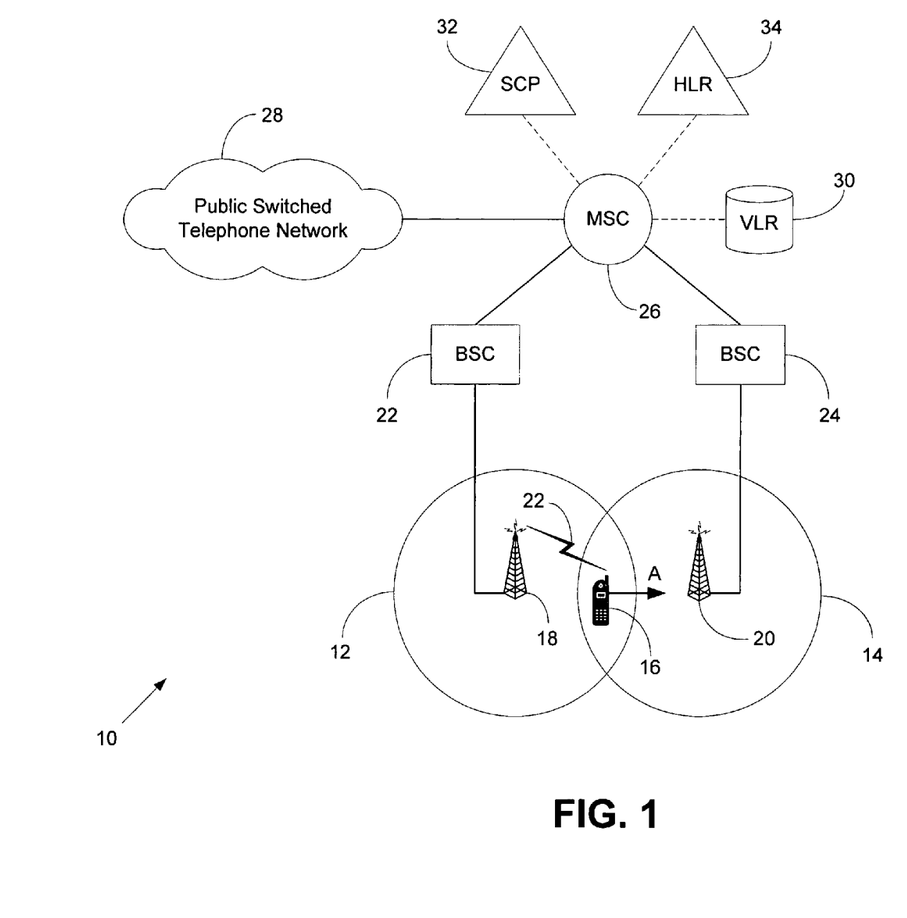
FIG. 1 is a simplified block diagram of a wireless telecommunications network, in accordance with an exemplary embodiment of the present invention.

Referring to the drawings, FIG. 1 is a simplified block diagram of an exemplary wireless telecommunications network 10 in which exemplary embodiments of the present invention may be employed. Network 10 includes a plurality of wireless coverage areas, including wireless coverage areas 12 and 14. Although, for purposes of illustration, FIG. 1 shows only two wireless coverage areas, it is to be understood that network 10 could include more than two wireless coverage areas. Moreover, it is to be understood that FIG. 1 represents the geographic extent of wireless coverage areas 12 and 14 as circles for purposes of illustration only. In general, wireless coverage areas in network 10 could have different shapes and sizes. Wireless coverage areas could also overlap, such that in a given geographic location a mobile station could potentially use either of the overlapping wireless coverage areas for wireless communication. In the example shown in FIG. 1, a mobile station 16 is located in an area in which wireless coverage areas 12 and 14 overlap.

Allocated to each wireless coverage area in network 10 are one or more uplink channels and one or more downlink channels for wireless communication with mobile stations, such as mobile station 16. Mobile station 16 could be, for example, a wireless telephone, a wireless personal digital assistant (PDA), a wirelessly equipped laptop computer, or other type of wireless communication device. The wireless communication with mobile stations, such as mobile station 16, may occur in a digital format, such as CDMA, TDMA, or GSM, or they may occur in an analog format, such as AMPS. Preferably, CDMA is used. Applicable CDMA formats are described, for example, in TIA/EIA/IS-95-B (published Oct. 31, 1998) and in TIA/EIA/IS-2000 Series, Rev. A-2 (published April 2002), which are incorporated herein by reference.

Each wireless coverage area may include a base transceiver station (BTS) that transmits wireless signals to mobile stations, using one or more downlink channels, and receives wireless signals from mobile stations, using one or more uplink channels. For example, FIG. 1 shows a BTS 18 that transmits and receives wireless signals for wireless coverage area 12 and a BTS 20 that transmits and receives wireless signals for wireless coverage area 14. For example, FIG. 1 shows mobile station 16 wirelessly communicating with BTS 18, via an air interface 22. The wireless communication represented by air interface 22 could make use of one or more uplink channels and/or one or more downlink channels of wireless coverage area 12. Although FIG. 1 shows separate BTSs 18 and 20 for wireless coverage areas 12 and 14, a BTS could provide multiple wireless coverage areas, for example, by using directional antennas to provide different sectors and/or by using different frequencies.

The types of uplink and downlink channels used by wireless coverage areas 12 and 14 will, in general, depend on the format of the wireless communication that is used. For example, in an IS-95-B CDMA air interface, the downlink channels share the spectrum of a 1.23 MHz wide downlink band, and the uplink channels share the spectrum of a separate 1.23 MHz wide uplink band. More particularly, the downlink band may be formed by a downlink carrier frequency modulated by a pseudonoise (PN) sequence at a 1.23 MHz chipping rate, and the uplink band may be formed by a different, uplink carrier frequency modulated by a PN sequence at a 1.23 MHz chipping rate. Up to 512 wireless coverage areas may use the same 1.23 MHz uplink and downlink bands without interference by using a distinct PN offset in each wireless coverage area. Interference can also be avoided by using different frequencies in neighboring wireless coverage areas for the uplink and downlink bands. Thus, each wireless coverage area, among neighboring wireless coverage areas in network 10, may use distinct PN offsets and/or distinct frequencies. Within each wireless coverage area, the downlink band may accommodate up to nine (9) control channels, e.g., a pilot channel, a sync channel, up to seven (7) paging channels, and up to sixty-one (61) traffic channels, identified by distinct Walsh codes. The uplink band in each wireless coverage area may accommodate up to thirty-two (32) access channels and sixty-two (62) traffic channels, identified by distinct PN codes. Other CDMA specifications, such as IS-2000 may support different channels and different bandwidths.

BTSs 18 and 20 may be connected to various network elements of wireless telecommunications network 10, which network elements may be either circuit-switched network elements or packet-switched network elements. In an exemplary embodiment, BTSs 18 and 20 may be connected to base stations controllers (BSCs) 22 and 24, respectively. Although FIG. 1 shows BSCs 22 and 24 each connected to a single BTS, in general, a BSC may be connected to more than one BTS. Thus, although FIG. 1 shows BTSs 18 and 20 connected to different BSCs, alternatively, BTSs 18 and 20 could be connected to the same BSC. BSCs 22 and 24 may control the BTSs to which they are connected, for example, by performing various radio resource management functions. BSCs 22 and 24 may also control handoffs, i.e., serve as handoff controllers.

BSCs 22 and 24 may, in turn, be connected to other circuit-switched network elements and/or packet-switched network elements of wireless telecommunications network 10. For example, BSCs 22 and 24 may be connected to a mobile switching center (MSC) 26, as shown in FIG. 1. Although FIG. 1 shows BSCs 22 and 24 connected to the same network element (i.e., to MSC 26), in general, BSCs 22 and 24 could be connected to different network elements. For example, BSCs 22 and 24 could be connected to different MSCs.

MSC 26 may be connected to public-switched telephone network (PSTN) 28. MSC 26 may switch calls to and from mobile stations operating in areas served by MSC 26, e.g., wireless coverage areas 12 and 14. Such calls may be carried by PSTN 28 and/or other networks, such as packet-switched networks. MSC 26 may also be communicatively coupled to (or may include) a visitor location register (VLR) 30. MSC 26 may also be able to signal to a home location register (HLR) 32 and to a service control point (SCP) 34. The signaling between MSC 26 and HLR 32 may conform to IS-41 specifications. A recent revision of the IS-41 specifications, ANSI/TIA/EIA-41-D-97, published in December 1997, is incorporated herein by reference. The signaling between MSC 26 and SCP 34 may conform to the specification "Wireless Intelligent Network," TIA/EIA/IS-771, published in July 1999, which is incorporated herein by reference. Other signaling protocols could be used, however.

3. Idle-State Handoff

In one illustrative case, mobile station 16 is in an idle state and is moving away from BTS 18 and toward BTS 20, as indicated by the arrow "A" in FIG. 1. Thus, mobile station 16 may be moving out of wireless coverage area 12 such that a handoff to wireless coverage area 14 could be beneficial.

In this idle state, mobile station 16 is not engaged in a call and is not using traffic channels of wireless coverage area 12. However, mobile station 16 is associated with wireless coverage area 12 in that mobile station 16 monitors a paging channel of wireless coverage area 12. Thus, wireless telecommunications network 10 can reach mobile station 16, e.g., to notify mobile station 16 of an incoming call or to provide other information or commands to mobile station 16, by broadcasting messages over the paging channel of wireless coverage area 12. Mobile station 16 may also be able to respond to such messages by sending messages over an access channel of wireless coverage area 12. In this way, mobile station 16 is communicatively coupled to wireless telecommunications network 10, via wireless coverage area 12.

Mobile station 16 may also monitor paging channels from, and, thus, be communicatively coupled to, more than one wireless coverage area. Mobile station 16 may maintain, as an "active set," a list of the wireless coverage areas with which it is communicatively coupled. The active set may identify each wireless coverage area by the distinct PN offset that it uses, as well as the frequency that it uses. Mobile station 16 may monitor the signal strengths of each of the pilot channels in its active set. However, one of the pilot channels in the active set may be designated as "primary."

Mobile station 16 may also monitor the signal strengths of pilot channels from other wireless coverage areas that are identified in a "neighbor set." In an exemplary embodiment, the mobile station obtains the "neighbor set" by receiving an extended neighbor list (ENL) message. The ENL message may be periodically broadcast over the paging channel of wireless coverage area 12. The ENL may identify the pilot channels to monitor, for example, by PN offset and frequency. For example, the ENL may identify wireless coverage area 14, by the PN offset and frequency that it uses, as a neighboring area.

As described in more detail below, when the signal strength of a pilot channel in the neighbor set is sufficiently high, as measured by mobile station 16, then the wireless coverage area with that pilot channel may be considered to be a candidate for an idle-state handoff. In the example shown in FIG. 1, wireless coverage area 14 may be the candidate. Thus, a handoff of mobile station 16 from wireless coverage 12 to wireless coverage area 14 could be effected.

In some embodiments, mobile station 16 may effect the idle-state handoff on its own, i.e., by attempting to monitor the paging channel of wireless coverage area 14. If successful, mobile station 16 would add the wireless coverage area 14 to its active set. Mobile station 16 might, for awhile, continue monitoring the paging channel of wireless coverage area 12. However, at some point, the signal strength of the pilot channel of wireless coverage area 12, as measured by mobile station 16, may fall below a threshold value such that wireless coverage area 12 is dropped from the active set. In other embodiments, rather than effecting the idle-state handoff on its own, mobile station 16 may seek permission from a handoff controller, e.g., BSC 22, in wireless telecommunications network 10.

In an exemplary embodiment, the determination that the signal strength of a neighboring pilot channel is sufficiently high to be a candidate for an idle-state handoff is made in a two-step process. In one step, the absolute signal level of the neighboring pilot channel is compared to the absolute signal level of an active set pilot channel, e.g., the primary pilot channel. In another step, the relative signal level of the neighboring pilot channel is compared to the relative signal level of the primary pilot channel. If the absolute signal level of the neighboring pilot channel exceeds the absolute signal level of the primary pilot channel by at least a first predetermined amount (i.e., by at least a first threshold value, $T_1$) and the relative signal level of the neighboring pilot channel exceeds the relative signal level of the primary pilot channel by at least a second predetermined amount, (i.e., by at least a second threshold value, $T_2$) then the neighboring pilot channel is a candidate for an idle-state handoff. If mobile station 16 effects idle-state handoffs on its own, then mobile station 16 may make these comparisons on its own. However, if a handoff controller, e.g., BSC 22, is involved in effecting idle-state handoffs, then the handoff controller may make some or all of these comparisons.

The absolute and relative signal levels may be measured in various ways, e.g., depending on the type of wireless communications format. In the case of a CDMA format, the absolute signal level may be the energy per chip of the pilot channel ($E_c$). The relative signal level may be the ratio of $E_c$ to the total received power at the frequency of the pilot channel ($I_0$). Thus, in the example illustrated in FIG. 1, mobile station 16 may measure $E_c$ for the pilot channel of wireless coverage area 12 and for the pilot channel of wireless coverage area 14. If the pilot channels for wireless coverage areas 12 and 14 have the same frequency, then mobile station 16 may measure $I_0$ for that frequency and calculate $E_c/I_0$ for each of these pilot channels to determine their relative signal levels. If, however, wireless coverage areas 12 and 14 have pilot channels with different frequencies, then mobile station 16 may measure $I_0$ separately for wireless coverage areas 12 and 14.

Figure 2:
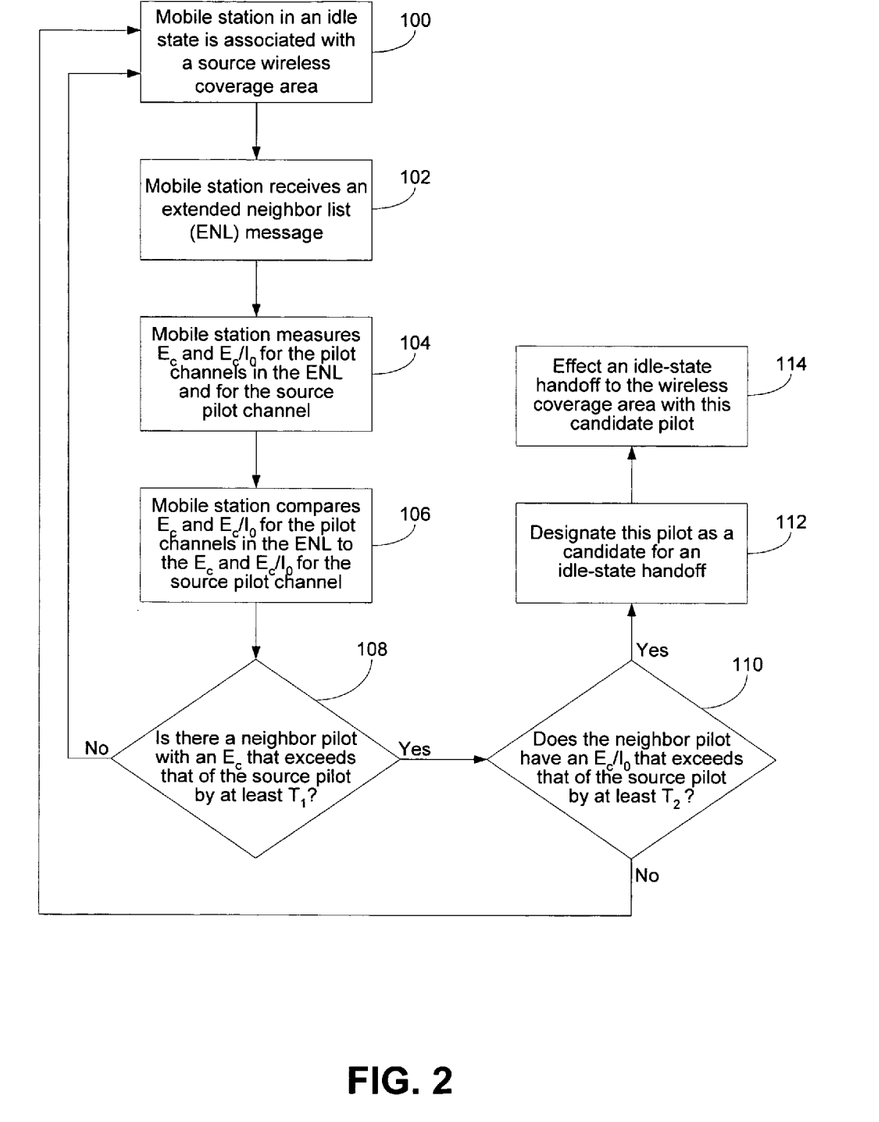
FIG. 2 is a flow chart illustrating a method for determining whether to effect an idle-state handoff, in accordance with an exemplary embodiment of the present invention.

FIG. 2 is a flow chart illustrating an exemplary method for determining whether to effect an idle-state handoff. As indicated by block 100, the process may begin with a mobile station in an idle state that is associated with a current or source wireless coverage area, e.g., mobile station 16 associated with wireless coverage area 12. The mobile station receives an extended neighbor list (ENL) message, as indicated by block 102. The ENL message could be a message that is broadcast periodically over a paging channel of the source wireless coverage area. The ENL message may identify each of the pilot channels to be measured by PN offset and frequency. In the example shown in FIG. 1, the pilot channel of wireless coverage area 14 might be included in the ENL.

In response to the ENL message, the mobile station measures an absolute signal level ($E_c$) and a relative signal level ($E_c/I_0$) for each of the pilot channels identified in the ENL (the "neighbor" pilots) and for the pilot channel of the source wireless coverage area ("source" pilot), as indicated by block 104. The source pilot may, for example, correspond to the primary pilot in the active set. The mobile station then compares the absolute signal levels ($E_c$) and the relative signal levels ($E_c/I_0$) of each of the neighbor pilots to the absolute signal level ($E_c$) and the relative signal level ($E_c/I_0$) of the source pilot, as indicated by block 106.

The mobile station makes these comparisons in order to perform a two-step determination of whether the absolute signal levels and relative signal levels of the neighboring pilots, as compared to the source pilot, justify a handoff. For example, the mobile station may determine whether any of the neighbor pilots have an absolute signal level ($E_c$) that exceeds that of the source pilot by at least a first predetermined amount ($T_1$), as indicated by block 108. If no neighbor pilot meets this criterion, then an idle-state handoff is not indicated. Thus, the process may return to the state indicated by block 100. If, however, a neighbor pilot does meet the criterion of block 108, then the mobile station may then determine whether this neighbor pilot also has a relative signal level ($E_c/I_0$) that exceeds that of the source pilot by at least a second predetermined amount ($T_2$), as indicated by block 110. If the neighbor pilot does not meet the criterion of block 110, then an idle-state handoff may not be indicated, and the process may return to the state indicated by block 100. If, however, the neighbor pilot does meet the criterion of block 110, then the mobile station may designate this neighbor pilot as a candidate for an idle-state handoff, as indicated by block 112. Although FIG. 2 describes an example in which the mobile station makes the determination based on absolute signal levels (block 108) before making the determination based on relative signal levels (block 110), these determinations could be made in different order.

If more than one neighbor pilot meets the criteria of blocks 110 and 112, then additional criteria may be used to select which of these neighbor pilots will be the candidate. For example, the mobile station may select as the candidate pilot the neighbor pilot that has the highest absolute signal level ($E_c$) among the neighbor pilots that meet the criteria of blocks 110 and 112.

If the mobile station is able to perform idle-state handoffs autonomously, the mobile station may then effect an idle-state handoff to the candidate wireless coverage area (i.e., the wireless coverage area that has the candidate pilot), as indicated by block 114. Specifically, the mobile station may move the candidate wireless coverage area to its active set and begin monitoring its paging channel. Alternatively, the mobile station may signal to a handoff controller, e.g., BSC 22, to seek permission before beginning to monitor the paging channel of the candidate wireless coverage area.

4. Active-State Handoff

In another illustrative case, mobile station 16 is in an active state and is moving away from BTS 18 and toward BTS 20, as indicated by the arrow "A" in FIG. 1. Thus, mobile station 16 may be moving out of wireless coverage area 12 such that a handoff to wireless coverage area 14 could be beneficial. In this active state, mobile station 16 is engaged in a call and is, thus, using a downlink traffic channel and an uplink traffic channel of wireless coverage area 12.

The process for determining whether to effect a handoff when the mobile station is an active state may be similar in certain respects to the process used when the mobile station is an idle state, i.e., may involve the same measurements of absolute signal levels and relative signal levels. However, when the mobile station is an active state, handoff controllers in wireless telecommunications network 10 may be involved in making handoff determinations. In an exemplary embodiment, BSCs may function as handoff controllers. Thus, in the example shown in FIG. 1, BSC 22 may determine whether to effect a handoff from wireless coverage area 12 to wireless coverage area 14. In addition, because wireless coverage areas 12 and 14 are served by different BSCs, the process of effecting the handoff may involve signaling between BSC 22 and BSC 24. If wireless coverage areas 12 and 14 are served by different MSCs, then the processing of effecting the handoff may also involve signaling between the respective serving MSCs.

Figure 3:
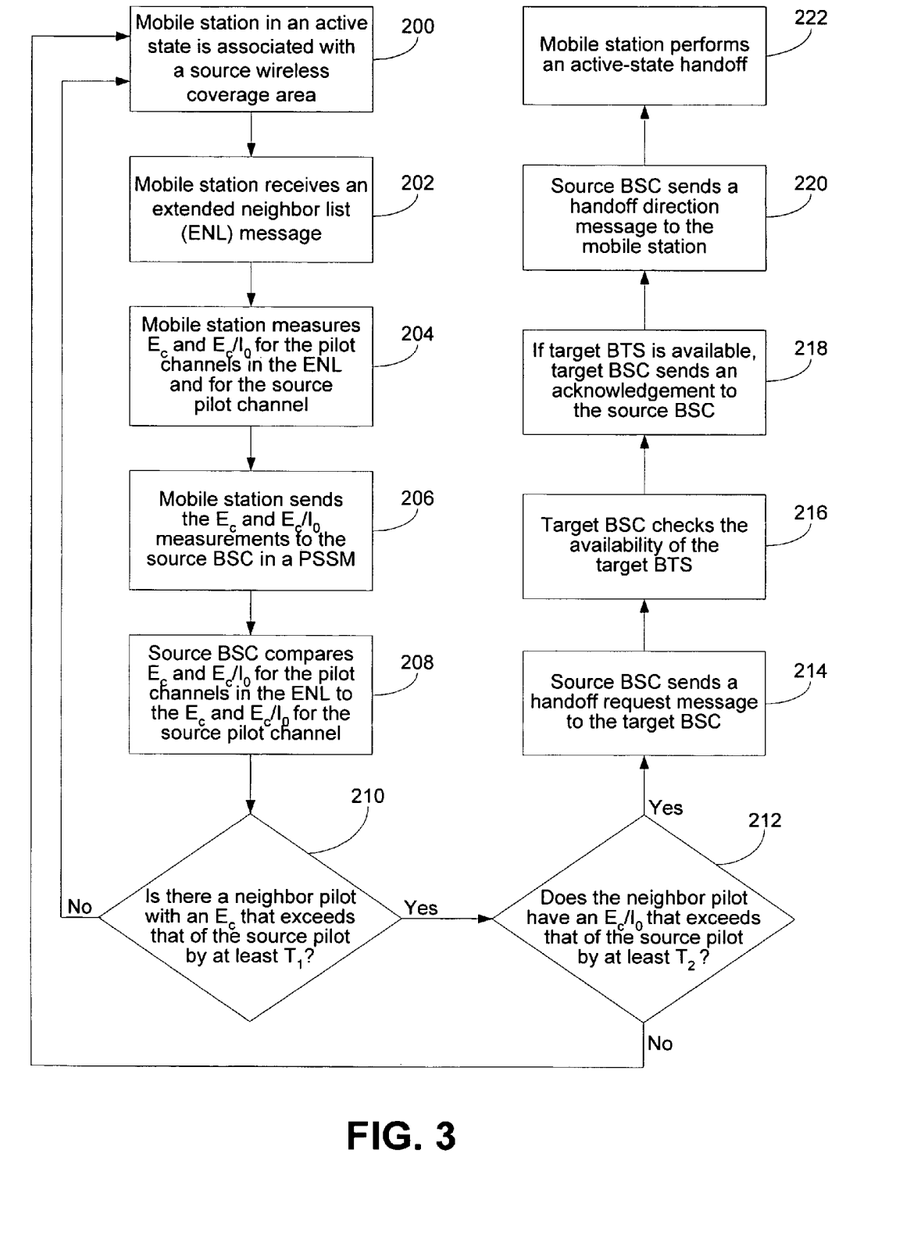
FIG. 3 is a flow chart illustrating a method for determining whether to effect an active-state handoff, in accordance with an exemplary embodiment of the present invention.

FIG. 3 is a flow chart illustrating an exemplary method for determining whether to effect an active-state handoff. As indicated by block 200, the process may begin with a mobile station in an active state that is associated with a current or source wireless coverage area, e.g., mobile station 16 associated with wireless coverage area 12. In this active state, the mobile station is engaged in a call and using a downlink traffic channel and an uplink traffic channel of the source wireless coverage area. The mobile station receives an extended neighbor list (ENL) message, as indicated by block 202. The ENL message could be a message that is broadcast periodically over a paging channel of the source wireless coverage area. The ENL message may identify each of the pilot channels to be measured, for example, by PN offset and frequency. In the example shown in FIG. 1, the pilot channel of wireless coverage area 14 might be included in the ENL.

In response to the ENL message, the mobile station measures an absolute signal level ($E_c$) and a relative signal level ($E_c/I_0$) for each of the pilot channels identified in the ENL (the "neighbor" pilots) and for the pilot channel of the source wireless coverage area ("source" pilot), as indicated by block 204. The mobile station then sends these $E_c$ and $E_c/I_0$ measurements, for example in a pilot strength measurement message (PSMM) to the source BSC, i.e., the BSC serving the source wireless coverage area, as indicated by block 206. Thus, in the example shown in FIG. 1, mobile station 16 may send a PSMM with the $E_c$ and $E_c/I_0$ measurements to BSC 22. Alternatively, instead of sending $E_c$ and $E_c/I_0$ measurements, the mobile station may send Ec and $I_0$ measurements for each of the neighboring pilot channels and the source pilot channel, and the source BSC may calculate the relative signal levels, $E_c/I_0$.

The source BSC then compares the absolute signal levels ($E_c$) and the relative signal levels ($E_c/I_0$) of each of the neighbor pilots to the absolute signal level ($E_c$) and the relative signal level ($E_c/I_0$) of the source pilot, as indicated by block 208. The source BSC makes these comparisons in order to perform a two-step determination of whether the absolute signal levels and relative signal levels of the neighboring pilots, as compared to the source pilot, justify a handoff. For example, the source BSC may determine whether any of the neighbor pilots have an absolute signal level ($E_c$) that exceeds that of the source pilot by at least a first predetermined amount ($T_1$), as indicated by block 210. If no neighbor pilot meets this criterion, then an active-state handoff may not be indicated. Thus, the process may return to the state indicated by block 100. If, however, a neighbor pilot does meet the criterion of block 210, the source BSC may then determine whether this neighbor pilot also has a relative signal level ($E_c/I_0$) that exceeds that of the source pilot by at least a second predetermined amount ($T_2$), as indicated by block 212. If the neighbor pilot does not meet the criterion of block 212, then an active-state handoff may not be indicated, and the mobile station may return to the state indicated by block 100. If, however, the neighbor pilot does meet the criterion of block 212, then the wireless coverage area with this neighbor pilot may be designated as a target for an active-state handoff. Although FIG. 3 describes an example in which the source BSC makes the determination based on absolute signal levels (block 210) before making the determination based on relative signal levels (block 212), these determinations could be made in different order.

If more than one neighbor pilot meets the criteria of blocks 210 and 212, then additional criteria may be used to select which of these neighbor pilots will be the target. For example, the BSC may select as the target the neighbor pilot that has the highest absolute signal level ($E_c$) among the neighbor pilots that meet the criteria of blocks 210 and 212.

To begin the process of effecting a handoff to the target wireless coverage area, the source BSC may send a handoff request message to the target BSC, as indicated by block 214. Thus, in the FIG. 1 example, with wireless coverage area 14 as the target, BSC 22 would send the handoff request message to BSC 24. If, however, the source and target wireless coverage areas are served by the same BSC, this step may be omitted. In response to the handoff request message, the target BSC may check the availability of the target BTS to receive the mobile station, as indicated by block 216. Thus, in the FIG. 1 example, BSC 24 may check the availability of BTS 20. The process of checking for availability may involve checking whether the target BTS has sufficient radio resources, e.g., traffic channel availability, to serve the mobile station in its active state. If the target BTS is available, then target BSC sends an acknowledgement to the source BSC, as indicated by block 218.

In response to this acknowledgement, the source BSC sends a handoff direction message to the mobile station, as indicated by block 220. The handoff direction message may direct the mobile station to begin using the traffic channels of the target wireless coverage area, which may be identified by PN offset and frequency. In response, the mobile station performs the active-state handoff, as indicated by block 222. To do this, the mobile station may begin transmitting on the uplink traffic channel of the target wireless coverage area and may begin monitoring the downlink traffic channel of the target wireless coverage area. The mobile station may also exchange signaling messages with the source and/or target wireless coverage areas. In the case of a "soft" handoff, the mobile station may, for a certain period of time, continue transmitting on the uplink traffic channel of the source wireless coverage area and continue monitoring the downlink traffic channel of the source wireless coverage area. In the case of a "hard" handoff, the mobile station may stop using the traffic channels of the source wireless coverage area.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for determining whether to effect a handoff of a mobile station from a first wireless coverage area to a second wireless coverage area, said first wireless coverage area having a first downlink band, said first downlink band including a first pilot channel and a plurality of additional channels, said second wireless coverage area having a second downlink band, said second downlink band including a second pilot channel and a plurality of additional channels, said method comprising:

said mobile station measuring energy per chip of said first pilot channel as a first absolute signal level ($E_1$) of said first pilot channel;

said mobile station measuring energy per chip of said second pilot channel as a second absolute signal level ($E_2$) of said second pilot channel;

determining a first relative signal level ($R_1$) of said first pilot channel;

determining a second relative signal level ($R_2$) of said second pilot channel; and if $E_2$ exceeds $E_1$ by at least a first predetermined amount and $R_2$ exceeds $R_1$ by at least a second predetermined amount, effecting said handoff of said mobile station from said first wireless coverage area to said second wireless coverage area.

2. The method of claim 1, wherein said first and second downlink bands are both defined by a frequency, $f_0$, modulated by a pseudonoise (PN) sequence, but with distinct PN offsets.

3. The method of claim 2, further comprising:

said mobile station measuring a total received power level ($I_0$) at frequency $f_0$, wherein $R_1$ is equal to $E_1/I_0$ and $R_2$ is equal to $E_2/I_0$.

4. The method of claim 3, wherein determining a first relative signal level ($R_1$) of said first pilot channel comprises said mobile station calculating $R_1$, based on $E_1$ and $I_0$, and determining a second relative signal level ($R_2$) of said second pilot channel comprises said mobile station calculating $R_2$, based on $E_2$ and $I_0$.

5. The method of claim 4, further comprising:
said mobile station comparing $E_2$ to $E_1$ and comparing $R_2$ to $R_1$.

6. The method of claim 4, further comprising:
said mobile station reporting $E_1$, $E_2$, $R_1$, and $R_2$ to a handoff controller; and
said handoff controller comparing $E_2$ to $E_1$ and comparing $R_2$ to $R_1$.

7. The method of claim 3, further comprising:
said mobile station reporting $E_1$, $E_2$, and $I_0$ to a handoff controller.

8. The method of claim 7, wherein determining a first relative signal level ($R_1$) of said first pilot channel comprises said handoff controller calculating $R_1$, based on $E_1$ and $I_0$, and determining a second relative signal level ($R_2$) of said second pilot channel comprises said handoff controller calculating $R_2$, based on $E_2$ and $I_0$.

9. The method of claim 8, further comprising:
said handoff controller comparing $E_2$ to $E_1$ and comparing $R_2$ to $R_1$.

10. The method of claim 1, wherein said first downlink band is defined by a first frequency ($f_1$) modulated by a PN code and said second downlink band is defined by a second, different frequency ($f_2$) modulated by said PN code.

11. The method of claim 10, further comprising:
said mobile station measuring a first total received power level ($I_1$) at said first frequency ($f_1$) and measuring a second total received power level ($I_2$) at said second frequency ($f_2$), wherein $R_1$ is equal to $E_1/I_1$ and $R_2$ is equal to $E_2/I_2$.

12. The method of claim 11, wherein determining a first relative signal level ($R_1$) of said first pilot channel comprises said mobile station calculating $R_1$, based on $E_1$ and $I_1$, and determining a second relative signal level ($R_2$) of said second pilot channel comprises said mobile station calculating $R_2$, based on $E_2$ and $I_2$.

13. The method of claim 12, further comprising:
said mobile station comparing $E_2$ to $E_1$ and comparing $R_2$ to $R_1$.

14. The method of claim 11, further comprising:
said mobile station reporting $E_1$, $E_2$, $R_1$, and $R_2$ to a handoff controller; and
said handoff controller comparing $E_2$ to $E_1$ and comparing $R_2$ to $R_1$.

15. The method of claim 11, further comprising:
said mobile station reporting $E_1$, $E_2$, $I_1$, and $I_2$ to a handoff controller.

16. The method of claim 15, further comprising:
said handoff controller comparing $E_2$ to $E_1$ and comparing $R_2$ to $R_1$.

17. The method of claim 1, wherein said handoff is an idle-state handoff.

18. The method of claim 1, wherein said handoff is an active-state handoff.

19. A method for determining whether to effect an idle-state handoff of a mobile station, said mobile station monitoring an active set that includes a primary pilot channel in a primary downlink band and a neighbor set that includes a plurality of neighbor pilot channels in neighbor downlink bands, said primary downlink band including a plurality of traffic channels in addition to said primary pilot channel, said neighbor downlink bands including a plurality of traffic channels in addition to said neighbor pilot channels, said method comprising:
said mobile station measuring energy per chip of said primary pilot channel as an absolute signal level ($E_P$) of said primary pilot channel;
said mobile station measuring a relative signal level ($R_P$) of said primary pilot channel;
said mobile station measuring energy per chip of said neighbor pilot channels as absolute signal levels of said neighbor pilot channels;
said mobile station measuring relative signal levels of said neighbor pilot channels;
if at least one of said neighbor pilot channels has an absolute signal level ($E_C$) that exceeds $E_P$ by at least a first predetermined amount and a relative signal level ($R_C$) that exceeds $R_P$ by at least a second predetermined amount, designating a candidate pilot channel from among said at least one of said neighbor pilot channels; and
effecting said idle-state handoff to a wireless coverage area associated with said candidate pilot channel.

20. The method of claim 19, wherein effecting said idle-state handoff comprises said mobile station adding said candidate pilot channel to said active set.

21. The method of claim 19, further comprising:
said mobile station measuring a total received power level, $I_0$, wherein $R_C$ is equal to $E_C/I_0$.

22. A method for determining whether to effect an active-state handoff of a mobile station from a source wireless coverage area to a target wireless coverage area, said source wireless coverage area having a source pilot channel and a plurality of additional channels in a source downlink band, said source downlink band having a source frequency, said target wireless coverage area having a target pilot channel and a plurality of additional channels in a target downlink band, said target downlink band having a target frequency, said method comprising:
said mobile station measuring energy per chip of said source pilot channel as an absolute signal level ($E_S$) of said source pilot channel;
said mobile station measuring a relative signal level ($R_S$) of said source pilot channel;
said mobile station measuring energy per chip of said target pilot channel as an absolute signal level ($E_T$) of said target pilot channel;
said mobile station measuring a relative signal level ($R_T$) of said target pilot channel;
said mobile station transmitting a measurement message to a handoff controller, said measurement message including $E_S$, $R_S$, $E_T$, and $R_T$;
said handoff controller comparing $E_T$ to $E_S$ and comparing $R_T$ to $R_S$; and
if $E_T$ exceeds $E_S$ by at least a first predetermined amount and $R_T$ exceeds $R_S$ by at least a second predetermined amount, effecting said active-state handoff of said mobile station from said source wireless coverage area to said target wireless coverage area.

23. The method of claim 22, wherein effecting said active-state handoff comprises said handoff controller transmitting a handoff direction message to said mobile station.

24. The method of claim 22, wherein said mobile station measuring a relative signal level ($R_S$) of said source pilot channel comprises:
said mobile station measuring a total received power level ($I_S$) at said source frequency; and
said mobile station calculating $R_S$ as the ratio of $E_S$ to $I_S$.

25. The method of claim 22, said mobile station measuring a relative target level ($R_T$) of said target pilot channel comprises:

said mobile station measuring a total received power level ($I_T$) at said target frequency; and said mobile station calculating $R_T$ as the ratio of $E_T$ to $I_T$.

26. The method of claim 22, wherein said source frequency and said target frequency are the same.

27. The method of claim 22, wherein said source frequency and said target frequency are different.

* * * * *